(12) United States Patent
Lankreijer (10) Patent No.: US 8,688,925 B2
(45) Date of Patent: Apr. 1, 2014

(54) METHOD FOR COMMUNICATION BETWEEN TWO MEMORY-RELATED PROCESSES IN A COMPUTER SYSTEM, CORRESPONDING SOFTWARE PRODUCT, COMPUTER SYSTEM AND PRINTING SYSTEM (75) Inventor: Herman Lankreijer, Hofsingelding (DE)

(73) Assignee: Océ Printing Systems GmbH, Poing (DE)

( * ) Notice: Subject to any disclaimer, the term of this patent is extended or adjusted under 35 U.S.C. 154(b) by 1268 days.

(21) Appl. No.: 12/539,106

(22) Filed: Aug. 11, 2009

(65) Prior Publication Data

US 2010/0042784 A1 Feb. 18, 2010

(30) Foreign Application Priority Data

Aug. 14, 2008 (DE) .......................... 10 2008 037 651

(51) Int. Cl.
*G06F 9/54* (2006.01)
*G06F 12/00* (2006.01)
*G06F 13/00* (2006.01)

(52) U.S. Cl.
USPC ......... 711/154; 711/1; 711/E12.001; 719/313

(58) Field of Classification Search
None
See application file for complete search history.

(56) References Cited

U.S. PATENT DOCUMENTS

| | | | | | |
|---|---|---|---|---|---|
| 5,615,355 | A | * | 3/1997 | Wagner | 711/167 |
| 5,635,703 | A | * | 6/1997 | Tanaka | 710/242 |
| 5,666,532 | A | * | 9/1997 | Saks et al. | 710/39 |
| 6,161,169 | A | * | 12/2000 | Cheng | 711/150 |
| 6,282,150 | B1 | * | 8/2001 | Edo | 365/230.03 |
| 6,665,747 | B1 | * | 12/2003 | Nazari | 710/22 |

(Continued)

FOREIGN PATENT DOCUMENTS

| | | |
|---|---|---|
| WO | WO 01/40931 A2 | 6/2001 |
| WO | WO 03/065197 A2 | 8/2003 |
| WO | WO 2006/131471 A1 | 12/2006 |

OTHER PUBLICATIONS

The GNU C Library. "The GNU C Library Reference Manual," Ed. 0.10, for Ver. 2.2.x of the GNU C Library. Documentation published Jul. 6, 2001, retrieved Dec. 5, 2003. <http://web.archive.org/web/20031205223534/http://www.gnu.org/software/libc/manual/html_mono/libc.html>.*

(Continued)

*Primary Examiner* — Alford W. Kindred
*Assistant Examiner* — Daniel Bernard
(74) *Attorney, Agent, or Firm* — Schiff Hardin LLP (57) ABSTRACT

For optimized communication between two memory-related processes in a computer system, a synchronization function is coupled with an operating system function such that it withholds an output of an operating system message that signals a data end of a file in a memory region of the computer system. It can thus be avoided that a memory read process interrupts the reading of the file because a memory write process has not yet written all data of the file into the corresponding memory region.

14 Claims, 6 Drawing Sheets

(56) References Cited

U.S. PATENT DOCUMENTS

| | | | |
|---|---|---|---|
| 7,551,612 B2* | 6/2009 | Kobayashi et al. | 709/227 |
| 7,684,426 B2* | 3/2010 | Narvaez et al. | 370/419 |
| 8,429,672 B2* | 4/2013 | Lankreijer | 719/314 |
| 2002/0046219 A1* | 4/2002 | Iida | 707/501.1 |
| 2003/0041086 A1 | 2/2003 | Lankeijer | |
| 2003/0229514 A2* | 12/2003 | Brown | 705/2 |
| 2004/0148363 A1* | 7/2004 | Hadi | 709/217 |
| 2004/0239985 A1* | 12/2004 | Benz et al. | 709/203 |
| 2005/0119901 A1* | 6/2005 | Ullrich | 705/1 |
| 2005/0240943 A1* | 10/2005 | Smith et al. | 719/328 |
| 2006/0022862 A1* | 2/2006 | Egawa et al. | 341/155 |
| 2007/0078901 A1* | 4/2007 | Satou et al. | 707/200 |
| 2007/0157134 A1* | 7/2007 | Cheng et al. | 716/4 |
| 2008/0209439 A1 | 8/2008 | Lankreijer | |
| 2009/0122610 A1* | 5/2009 | Danon et al. | 365/185.08 |

OTHER PUBLICATIONS

Richard J. Moore, IBM Linux Technology Centre. "Generalised Kernel Hooks Interface: A High Speed Call-back Mechanism for the Linux Kernel." UKUUG Linux 2001, Jul. 1, 2001.*

Richard J. Moore et al., "How to use Kernel Hooks?" © IBM Corp. 2000,—Oct. 4, 2001.

IBM Linux Technology Centers Kernel Hooks 2004.

fgetc—The Open Group base Specifications Issue 6 IEEE Std 1003.1 2004 Edition.

Digital Printing, Technology and Printing Techniques of Océ Digital Printing Presses, 9, Edt. Feb. 2005, ISBN 3-00-001081-5, p. 15.

Dementiev, R. et al.: STXXL: Standard Template Library for XXL Data Sets. Technical Report 2005/18.

McCall, D.: Asynchronous I/O on linux. Updated Mar. 7, 2008.

* cited by examiner

METHOD FOR COMMUNICATION BETWEEN TWO MEMORY-RELATED PROCESSES IN A COMPUTER SYSTEM, CORRESPONDING SOFTWARE PRODUCT, COMPUTER SYSTEM AND PRINTING SYSTEM

BACKGROUND

The preferred embodiment concerns a method for communication between two memory-related processes of a computer system in which a write process writes one file into a memory region predetermined by an operating system and a read process reads the file from this memory region. In particular, the preferred embodiment concerns a method for communication between two memory-related processes of a computer system in which a write process writes a file containing print data into a memory region predetermined by an operating system and a read process reads the file from this memory region in order to transfer print data into a digital printing system. Furthermore, the preferred embodiment concerns a corresponding software product, a computer system and a printing system.

Print servers for high-capacity printers are described in Chapter 15 in the book Digital Printing, Technology and Printing Techniques of Océ Digital Printing Presses, 9th Edition, 25 Feb. 2005, ISBN 3-00-001081-5.

Figure 1:
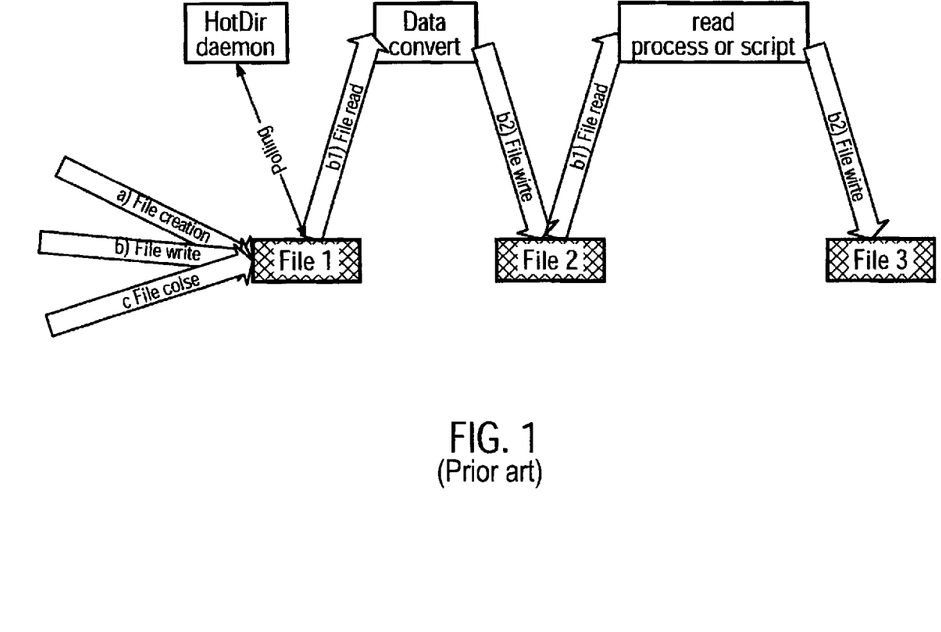
FIG. 1 shows a high-capacity printing system.

The workflow of a method used in an Océ PRISMAproduction Document Output Management System for communication between two processes of a computer system for transferring print data is schematically shown in FIG. 1. In this method, a folder in the computer system is monitored by means of a service program ("daemon") as to whether a write process writes a file (File1) into the monitored folder. Three work steps for storage administration are executed in the course of the storage of the file, namely a Step a for generation of the basic file data ("File creation"), Step b in which the data are written into the memory region provided for the file ("File write"), and Step c in which the file is closed ("File close"). In the workflow shown in FIG. 1, a process tree of the operating system or memory register is furthermore monitored as to whether a new file is generated by a process. Whether the process has closed the file (File1) is then polled at regular intervals. The write process is therefore ended and the written file is complete.

A process reading the file (File1) is subsequently started in order to read the file. In the example shown in FIG. 1, the process "Data convert" reading the file is a process to convert the data contained in the file. The data from this process are written into a second file (File2). These written data are then in turn read by an additional process "read process or script" in order to store them in a third file (File3), for example to be supplied to a printing apparatus for a print output process.

In this known method, the data must always be completely written into a separate file before they can be read by an additional process.

A method similar to the method shown in FIG. 1 arises from WO 03/065197 A2, with which files of a document processing job or print job are buffered in a folder of a receiving server that is automatically checked for newly arrived files at regular time intervals. This newly arrived file is supplied for further processing. The check is controlled by means of a computer program. A new print job can be generated from every newly arrived file. A newly arrived file can also be added to an existing print job for further processing. The control mode can be selected from at least two folder-related settings and be associated with the folder.

A method for synchronization of program segments of a computer program arises from WO 01/40931 A2. This method is provided for synchronization of program segments that can run on different processors.

This method for synchronization of program segments provides a buffer in which the reading and writing is controlled by means of a standard function (for example a semaphore) and by means of one or more buffer sector flags. For this the buffer is controlled with the standard function or the buffer flag from buffer methods. This control occurs such that, during the access to the buffer by a first buffer method, a simultaneous access to the buffer for a second buffer method is prevented. The access of read program segments and generation program segments to buffer sectors is controlled with the buffer sector flag, which is set by the buffer method. Specific buffer sectors are released with the access of the buffer methods. After a release has occurred, it is possible that data are simultaneously read or, written in different buffer sectors.

This method is advantageous for program segments running on different processors since the data transfer between individual program segments is designed to be very efficient and versatile, and the data are asynchronously transferred between individual program segments.

A method for data transfer between program elements of a process arises in WO 2006/131471 A1. A buffer object that has a buffer and control methods is respectively provided between the program elements. A control method of the buffer object informs one of the associated program elements when the buffer is full or empty so that this program element begins reading the data from the buffer or writing the data into the buffer. An active buffer object is thus provided here that is provided between program elements of a process. This buffer object is in particular used to generate and debug different process parts and the subsequent connection of the process parts into a single process by means of the buffer object.

Operating systems are required for the operation of modern computers. These operating systems in turn normally contain an operating system kernel as their central component. Process and data organizations are normally established in the kernel on which additional software components of the operating system (and possibly user programs) build. Typical requirements for a system kernel are the parallel processing of various tasks (what is known as multitasking), the maintenance of time-critical limits and the transparency for other applications.

Kernels are normally constructed in layers, wherein the lower layers closer to the machine form the basis for the upper layers. The upper layers can thereby typically call functions of the lower layers, but not vice versa.

The following layers can be present in particular, from bottom to top:
  interface layer to the hardware, for example input/output devices, memory, processors
  layer for memory administration, in particular including virtual main memory
  layer for process administration (scheduler)
  layer for device administration (device management)
  layer for the administration of the file systems If all of these functions or layers are integrated into the kernel itself, it is called a monolithic kernel. In what is known as a microkernel, parts of these occur in separate processes. What are known as the user processes also run outside of the kernel, which user processes make use of the functions offered by the kernel in order to communicate with the aforementioned components of the computer.

Also known from operating systems are what are known as kernel hooks that serve as an interface in order to enable the calling of a routine at specific points in a kernel from outside of the kernel. For example, for the Linux operating system such kernel hooks are described in two articles from the IBM Linux Technology Center, namely "Kernel Hooks" at http://www-124.ibm.com/linux/projects/kernelhooks and Richard J Moore et al., "How to use Kernel Hooks?", (c) IBM Corp. 2000, http://www124.ibm.com/linux/projects/kernelhooks/2.6-KernelHooks-HOWTO.

The publications cited in the preceding are herewith incorporated by reference into the present Specification.

SUMMARY

It is an object to achieve a method for communication between two memory-related processes of a computer system that is of simple design and nevertheless can transfer data efficiently.

In a method or system for communication between two memory-related processes of a computer system, with a write process writing a file into a predetermined memory region and reading with the read process data contained in the file from the memory region. The memory region is administered by a memory management system of an operating system that detects an end of the data in the memory region. A synchronization function is linked to the operating system independent of the two memory-related processes, the synchronization function, given temporally overlapping execution of the write process and the read process, monitoring the read region as to whether the file to be written is released. In case of a data request by the read process and a message automatically generated as a result of the memory management system identifying the end of the data in the memory region, an output of the message to the read process is withheld until the file to be written is closed by the write process.

DESCRIPTION OF THE PREFERRED EMBODIMENT

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In a method according to the preferred embodiment for communication between two memory-related processes, a read process and a write process of a computer system exchange data. The write process writes a file into a memory region predetermined by an operating system. The read process reads the file from this memory region. The preferred embodiment is characterized in that the write process and the read process can be executed overlapping in time, wherein the operating system is coupled with a synchronization function independent of the two processes, which synchronization function monitors the write process as to whether the file to be written has been released, and monitors the read process as to whether a message indicating the end of the file has been held in reserve until the file to be written is concluded by the write process.

Upon reading the data from the predetermined memory region, after the complete read of all existing data the operating system or its memory management system respectively generates a message that is typically designated as an EOF (End Of File) message in diverse operating systems (for example Linux or Microsoft Windows). However, in the present method the generation of this message does not mean that the complete file must be read since the writing and reading are executed overlapping in time, and it can be that the read process has read all data from the specific memory regions before the write process has written the entire file into the predetermined memory region. According to the preferred embodiment, this message is held in reserve until the file to be written is released based on the monitoring of the write process.

Since the synchronization function is designed independent of the two memory-related processes, any such processes can communicate among one another with the method according to the preferred embodiment. This is a significant advantage since two memory-related processes that have been produced by different persons or software vendors can thus communicate efficiently with one another without having to attune them to one another with regard to the communication. Sometimes it is not possible to modify the memory-related processes, such that the communication between the memory-related processes cannot be adapted, for example in batch processing files (scripts). The communication between such memory-related processes must be executed exclusively with standardized operating system commands.

The single adjustment between the two memory-related processes is that both memory-related processes access the same memory region, wherein the one memory-related process writes data into this memory region with one standard operating system function (for example Write) and the other memory-related process reads data from the memory region with a standard operating system function (for example Read). The synchronization function automatically recognizes that two processes are accessing the same memory region and automatically synchronizes the write process and the read process.

The predetermined memory region in which the data are written or from which the data are read does not need to be explicitly defined by the processes. For example, this memory region can be defined by an address in the cache memory or by path and file name on a hard disk.

A memory-related process in the sense of the present disclosure can comprise one or more program segments or threads. A memory region (in particular a separate and/or virtual memory region in a non-volatile memory and/or volatile memory of the computer system) is directly or indirectly associated with every memory-related process for communication within this process. A memory-related process can execute direct operations on the memory, such as the reading or the writing of data from or into the memory. However, a memory-related process can also prepare data for writing and/or process data read from the memory.

With the method according to the preferred embodiment it is possible to execute the writing by the write process and the reading by the read process simultaneously, wherein the read process reads data already written into the predetermined memory regions. It is not necessary that the writing of a file must be terminated first before the read process can be started. The communication is hereby accelerated since the reading of the data can already be started very early.

The write process and the read process can access the same memory region virtually simultaneously. It is not necessary that the memory region be subdivided into different sectors that are released either for reading or for writing. The reading and the writing can be executed alternately in the memory region by the multitasking controller typically contained in the operating system, wherein the corresponding control is taken over by the operating system. Due to the fast switch between write and read processes and their short memory accesses, the user receives the impression that the writing and reading are executed simultaneously and very quickly.

If the writing and reading of the file occur with a time offset, the writing and the reading can also be executed with the standardized commands for writing and reading, wherein the synchronization function coupled to these commands is in fact executed but without affecting the writing process and read process. It is thus "transparent" to a time-offset writing and reading. This is a significant advantage relative to other methods for temporally overlapping communication, for example what is known as named pipes which are exclusively suitable for a temporally overlapping communication but not a temporally offset communication.

In the writing of the data into a file, the data can be cached in a cache memory from which they are written to their actual target memory region (for example on a hard disk or into a non-volatile memory etc.). The read process can hereby directly read the data from the cache memory, such that a much faster data transfer occurs between the write process and the read process. This reading from the cache memory is enabled via the synchronization function since only short segments of the file are to be cached in the cache memory due to the virtually simultaneous writing and reading, and thus the relatively low memory volume of a cache memory is sufficient in order to also exchange files between two processes that are significantly larger than the memory volume of a cache memory.

The synchronization function is advantageously coupled to a kernel of the operating system by means of kernel hooks. The synchronization function is thereby in particular a program segment that is stored in the memory of the user programs. However, the synchronization function is thereby called directly by the operating system by means of the kernel hook and thereby acts like a component of the present operating system.

With a kernel hook, program code that is present as a standard operating system function in the existing kernel of an operating system (for example the Linux operating system or the Microsoft Windows XP operating system) in particular a program that is located in the memory region of the user programs can be directly coupled with the operating system or to specific states of the operating system, i.e. can in practice be "linked" into the operating system.

Among other things, with the preferred embodiment it has been recognized that the mechanism of the kernel hooks for memory processes can be very advantageously utilized. The programs that are essentially integrated into the operating system by means of the kernel hooks can namely on the one hand be created by a program developer without changing the existing operating system. On the other hand, existing functions of the kernel can be changed, or new functions can be added to it by means of the programs to be added with kernel hooks. Due to the proximity of the operating system functions to the hardware, such "linked" processes can additionally be executed very quickly.

Arbitrary memory-related processes can quickly exchange files with one another with the corresponding "operating system extension" without the memory-related processes themselves having to be specially designed for a fast data exchange. They merely use the functions provided by the operating system to write the data or to read the data. The control of the write processes and read processes is then automatically taken over by the operating system.

The withholding of the message identifying the end of the data or of the file can be executed in different ways. The corresponding messages can thus be dismissed as long as no release for the file is present.

In particular, not only the messages identifying the end of the file are withheld; rather, messages or information about the location at which the data are to be read or to be written are also held until all data are read and written. This can occur via storage of pointers that indicate the address of the memory region at which the data are to be written or at which the data are to be read.

An additional advantageous preferred embodiment provides that the read process is positioned at a specific memory location with a positioning function (for example the "seek" function) in order to begin or continue the read process there. In the event that this memory location is at a position at which data has not yet been stored by the write process, an error message (generated by the operating system) that the positioning location lies outside of the current file or outside of the current memory region belonging to the file can then be withheld. The reading can then advantageously be started immediately as soon as the file is written with additional data at the positioning location of the positioning function without a repositioning or an adaptation of the read process being necessary.

In addition to the seek function, additional processes can access the file or the predetermined memory region (possibly also outside of the file), and corresponding operating system messages (in particular error messages) can be withheld. Other processes can thereby also be accelerated for successive processing of the data.

According to a preferred development, the synchronization function is extended with additional functions, for example a conversion function for conversion of the data format.

The method described above is particularly suitable for transferring print data between two memory-related processes in a digital high-capacity printing system, since here there is a significant need to transfer large amounts of data (data sets) quickly and reliably in one data direction. Due to the control of the communication at the operating system level, programming errors of the user are avoided since the memory-related processes provided by the user merely have to use standard functions of the operating system in order to realize this fast communication. Additionally, memory-related processes that have been programmed independently of one another can communicate with one another. This is a significant advantage since, for example, a communication between devices of different device manufacturers (that respectively supply the memory-related processes suitable for their device) is hereby possible. A high degree of compatibility is hereby achieved.

In particular, an optimized communication between two memory-related processes in a computer system can be achieved with the preferred embodiment in that the synchronization function is coupled with an operating system function such that it withholds the output of an operating system message that signals the data end of a file in a memory region of the computer system. It can thereby be avoided that the memory read process interrupts the reading of the file because the memory write process has not yet written all data of the file into the corresponding memory region.

An exemplary embodiment of the method for communication of two memory-related processes of a computer system is explained in detail in the following. The method is thereby used to transfer print data in a printing system. The printing system 1 shown as an example in FIG. 2 has a printing device 2 that is advantageously a digital high-capacity printer in order to print a paper web 3. The printing device 2 is connected via a data line 4 with a computer or print server 5.

Figure 2:
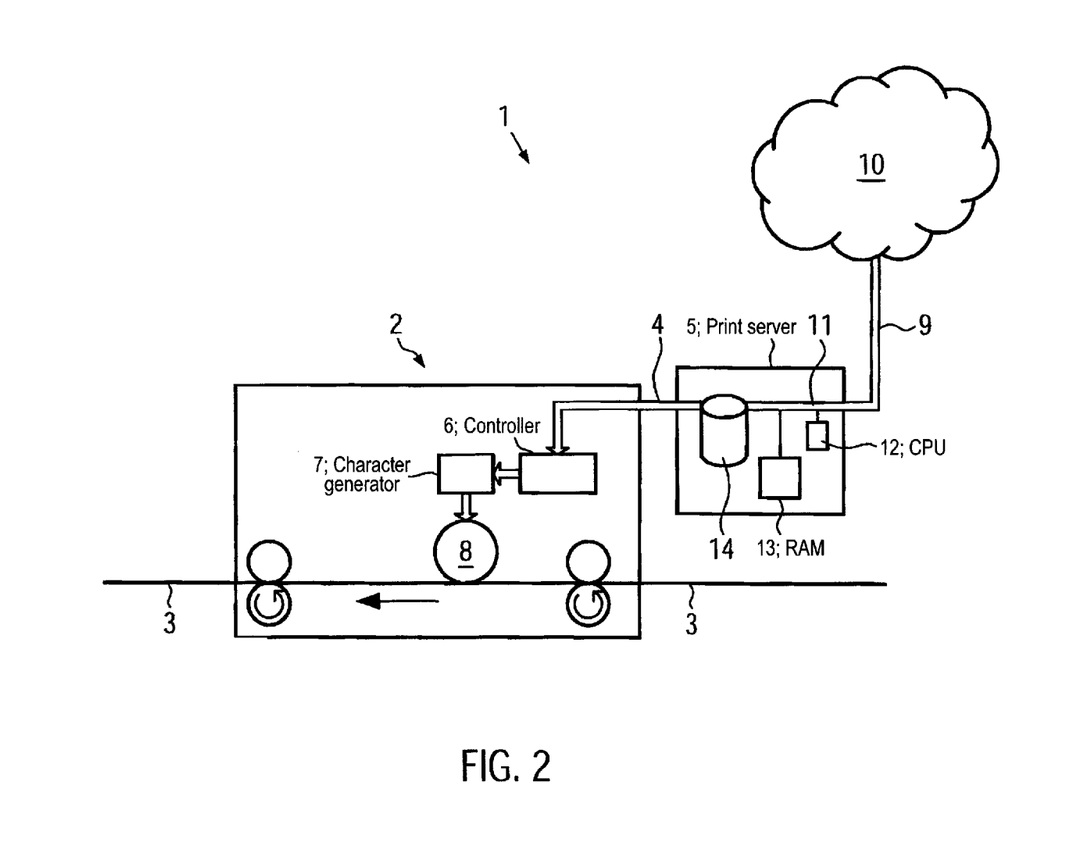
FIG. 2 schematically illustrates an exemplary embodiment of a method for communication of two memory-related processes of a computer system.

In the printing device 2, the data line 4 leads to a controller 6 in which the print data contained in the print data stream are prepared for a character generator 7 arranged downstream. The character generator 7 generates control signals to control a photoconductor drum 8 with which the print data are printed on the paper web 3. The character generator 7 and the photoconductor drum 8 form a printing group. This is a digitally controlled electrophotographic printing group. Instead of an electrophotographic printing group, an inkjet print head can also be provided or a print head operating according to another printing method. Instead of a web-shaped recording medium, a sheet-shaped recording medium can also be printed.

The paper web 3 for high-capacity printers is typically supplied from a roll. However, at the same time printing devices with very high capacity are also known that print single sheets with high speed in which the application of the present method for communication between two memory-related processes is likewise appropriate. Within the scope of this disclosure, high-capacity printers are printing devices that print in a range from 40 DIN A4 pages per minute to well more than 1000 DIN A4 pages per minute.

The print server 5 is connected via an additional data line 9 with a local or super-regional data network (LAN or WAN).

The print server 5 is either a print server that caches, prepares and relays the print data stream or a host at which the print job and the corresponding print data stream is generated. The print server 5 can be designed according to the print server described in Chapter 15 of the book cited in the preceding, "Digital Printing, Technology and Printing Techniques of Océ Digital Printing Presses", 9th edition, February 2005. It can additionally be integrated into a printing device 2.

The print server 5 has a data bus 11, a CPU 12, a volatile memory 13 (RAM) and a non-volatile mass storage 14 (for example a hard disk storage). The print server 5 is operated with a multitasking-capable operating system, for example Linux, Microsoft Windows XP or Microsoft Vista.

The operating system is extended via a synchronization function for synchronization of a write process and a read process as it is explained in detail below.

Application programs for preparation and relaying a print data stream are used at the print server 5. Every application program has at least one memory-related process that accesses one of the memories 13, 14 once or multiple times with a non-modified standard function or a standard command of the operating system (for example write or read to the memory 13, 14).

Figure 3:
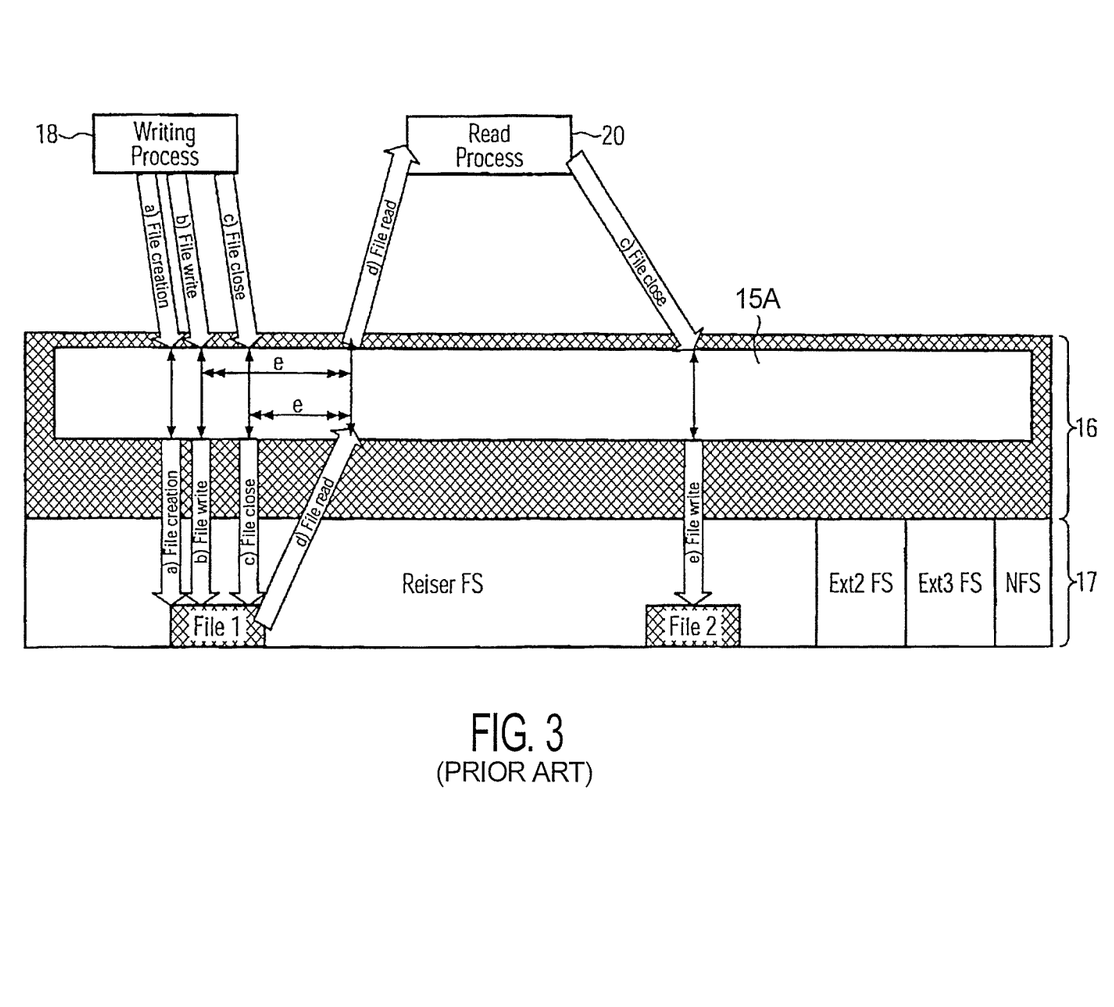
FIG. 3 illustrates a conventional prior art method for communication of two memory-related processes of a computer system.

Using FIG. 3, the synchronization function for synchronization of the communication of two memory-related processes of a computer system is subsequently explained using a first embodiment of the synchronization function. In addition to the elements shown in FIG. 3, elements from FIG. 1 (described above) can be provided in this embodiment. Insofar as correlations (matching elements) exist, these are provided with identical identifiers or reference characters.

The synchronization function 15A is coupled to the kernel 16 of the operating system by means of one or more kernel hooks. The operating system has a system-internal file system 17 that comprises system files and application files.

A write process 18 writes a file into a predetermined memory region with a standard command. The write process is executed in a known manner in three steps, wherein a file is initially generated (Step a); the data are then written (Step b); and finally the file is closed (Step c). These three work steps are received by the synchronization function 15A in the operating system. The synchronization function 15A is transparent for these three work steps, meaning that in principle it executes these without modification to the operating system and generates a corresponding file in a file system 17 (Step a), writes the data into the file (Step b) and closes the file (Step c). However, this is controlled by the synchronization function 15A within the operating system. The synchronization function 15A is linked to the standard operating system commands for reading and writing; it extends them via the special control function. In the region below the synchronization function 15A, the writing and reading occurs in a conventional manner, wherein the write process and read process is controlled by means of the conventional operating system functions.

Via the interposition of the synchronization function 15A it is possible to execute additional actions. In the present example, a data folder in which print jobs are stored is managed during the generation of the file in Step a. For example, a mirroring of the file can thereby be initiated.

The data are hereby initially written into a first file (File1). If a read process 20 reads these data with a standard operating system function at the same time, they are directly read out from the first file (File1) with interposition of the synchronization function 15A and passed to the read process 20 for processing. Given temporally overlapping write and read processes, the data that the write process 18 passes to the operating system for storage in the non-volatile memory can be cached by the operating system in a cache memory from which these are immediately read out again and passed to the read process 20 for further processing. If the write process 18 executes the read process 20 with a time offset, the data are stored in a file in the non-volatile memory which the read process 20 then directly or indirectly accesses later, as in a conventional method.

Since the writing and the reading of the data are executed virtually simultaneously, it can occur that the read process has read all data located in the memory region before all data of the file that are to be written have been written to the memory region. In practice it has turned out that this actually occurs relatively frequently, in particular when the read process 20 reads the data with a higher data throughput than that with which the write process 18 can write it. Every time that all data contained in the predetermined memory region have been completely read by the read process 20, a message that this is the end of the file is generated by the operating system function reading the data. This message is typically designated as an EOF (=End of File). For example, this message is presented as a flag in a header of a data message. However, since additional data that are to be written into the file still exist, the read file would be incorrectly closed to the read process 20 by a transmission of this message and the read process would be terminated. All of the data would not be read. Therefore, according to the first embodiment of the invention shown in FIGS. 4 and 6, these messages identifying the end of the file are initially held back (withheld) by the interposed synchronization function 15B, shown in FIG. 4 and at steps 100 and 200 in FIG. 6, and are advantageously deleted. The synchronization function 15B then relays the data to the read process 24C shown in FIG. 4 without these messages.

Figure 4:
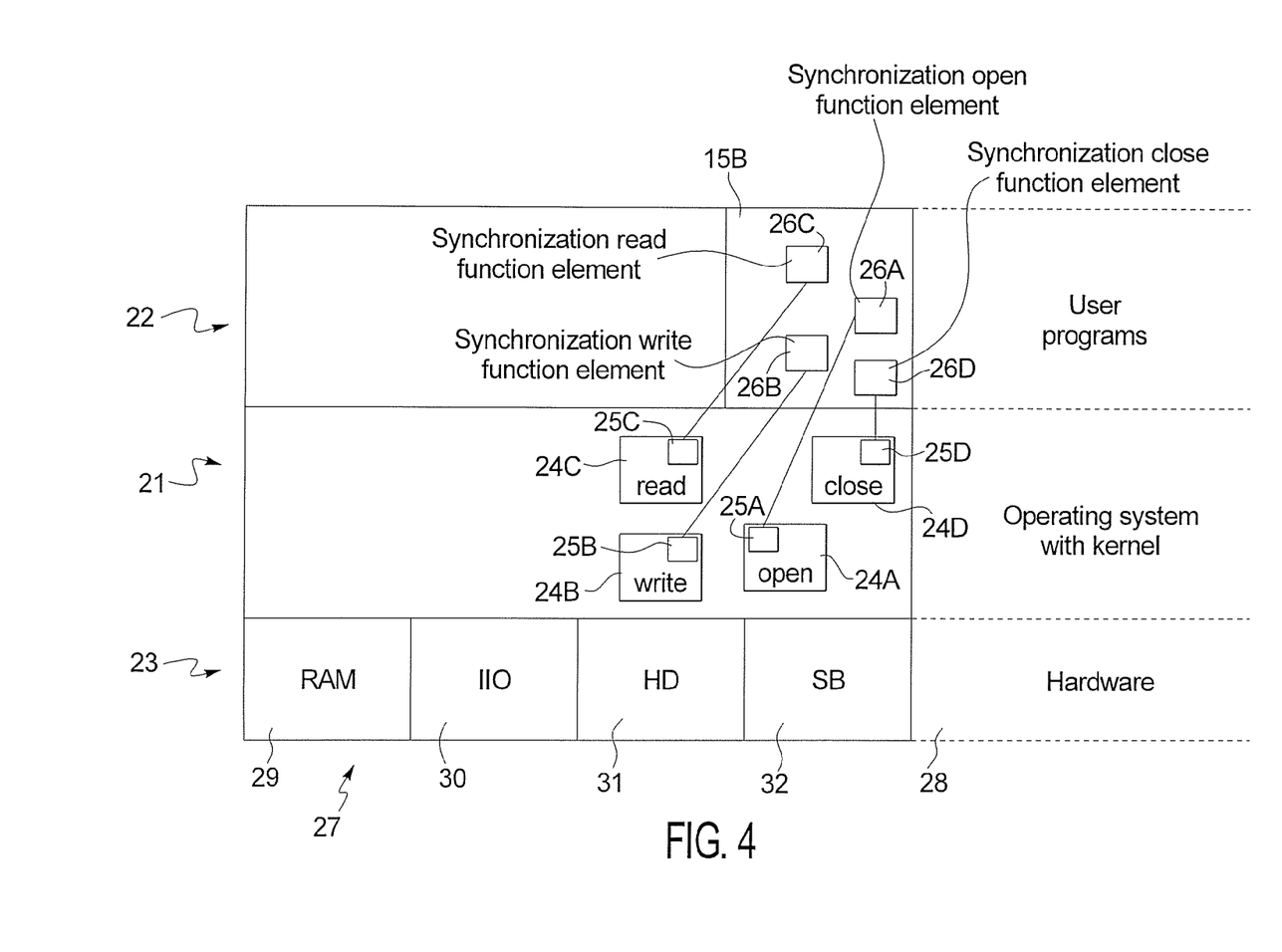
FIG. 4 illustrates the structure of a software that is suitable for execution of the method according to a first preferred embodiment.

The withholding of the message identifying the end of the file is lifted only when the synchronization function 15B establishes the work step of the closing of the file (Step c) initiated by the write process 24B (see FIG. 4). It is hereby ensured that all data are written into the file by the write process 24B, wherein a message identifying the end of the file that is transmitted without hindrance to the read process 24C is then generated after the reading of all remaining data by the read process 24C. The reading of the data of the file is only terminated when all data have actually been transferred from the write process 24B to the read process 24C.

The read process 24C can then process the data, or store them at another location via an additional write command, or transfer them to a predetermined recipient. The recipient is advantageously the printing apparatus 2 or a print server 5. In this case it is possible to execute the efficient processing of print data within a print server across print servers, up to the printing of print data simultaneously with the spooling (printing while spooling) with this method for communication of a write process 24B with a read process 24C. In principle, the method according to the preferred embodiment is advantageous in all data-processing, memory-related processes that can be executed in parallel.

Overall it is to be noted that the operating system functions that accept the data from the synchronization function, write it into the memory region, read it from the memory region and forward it to the synchronization function to control the writing and reading by means of the "End of File" message, as in a conventional method, and thus allow a per-sector writing and reading of the data. Here the conventional operating system functions are essentially used without modification. Only in the area between the system function and the memory-related processes is the control of the write process and read process of the memory-related processes decoupled from the actual writing and reading due to the withholding of the "End of File" (EOF) message. A virtually simultaneous writing and reading is thus achieved in a simple manner at the level of the memory-related processes, the virtually simultaneous writing and reading being automatically divided up at the level below the synchronization function into a per-sector writing and reading without having to provide new operating system functions for this per-sector writing and reading, which is in principle significantly more difficult to control.

A file folder "HotDir" can be placed on the printing system (for example on the print server 5 according to FIG. 2) with this method, into which file folder "HotDir" different print jobs can be written that are automatically supplied to the printing process as it is known from WO 03/065197 A2. Via the use of the present method, this known method can be developed to the effect that, insofar as printing capacity is provided at the printing device, the printing of the print jobs can already be started before the print job has been completely written into a folder.

Via the synchronization function 15B linked to the operating system, a significant acceleration of the data transfer is achieved without the corresponding user programs having to be specially designed in this regard. Rather, an even greater degree of freedom in the design of the user programs is achieved since only conventional operating system commands for writing and for reading are to be used. User programs of different manufacturers can hereby be coupled to one another in a simple manner.

A corresponding hardware and software structure is shown in a schematically simplified manner in FIG. 4. In a computer 27, the hardware interface layer 23 comprises control software for the hardware 28. In addition to a microprocessor, the hardware 28 has (among other things) a working system memory (random access memory, RAM) 29 for operating system and user programs; input/output devices 30 (for example keyboard, mouse and screen); a non-volatile memory 31 for operating system and user programs, for example a hard disc; and a system bus 32.

The software structure comprises two additional layers, namely the layer 21 of the operating system with the kernel and the layer 22 of the user programs. These two software layers 21, 22 are arranged above the hardware interface layer 23.

The kernel of the operating system or its memory management system comprises multiple functions 24A, B, C, D. The functions read 24C, write 24B, open 24A and close 24D are shown by way of example in FIG. 4. Each of these functions 24A, B, C, D has a kernel hook 25A, B, C, D.

The synchronization function is designed in the user program layer 22. The synchronization function 15B has individual read, write, open close synchronization function elements 26C, 26B, 26A, and 26D respectively that are linked to a corresponding operating system function 24C, 24B, 24A, 24D by means of a respective kernel hook 25C, 25B, 25A, 25D. Upon execution of one of these operating system functions 24A, B, C, D the corresponding function element 26A, B, C, D of the synchronization function 15B is respectively also called. The individual function elements 26A, B, C, D can access the common data, in particular common control parameters, such that they can fulfill complex control functions such as the specific withholding of the "End of File" message.

Figure 5:
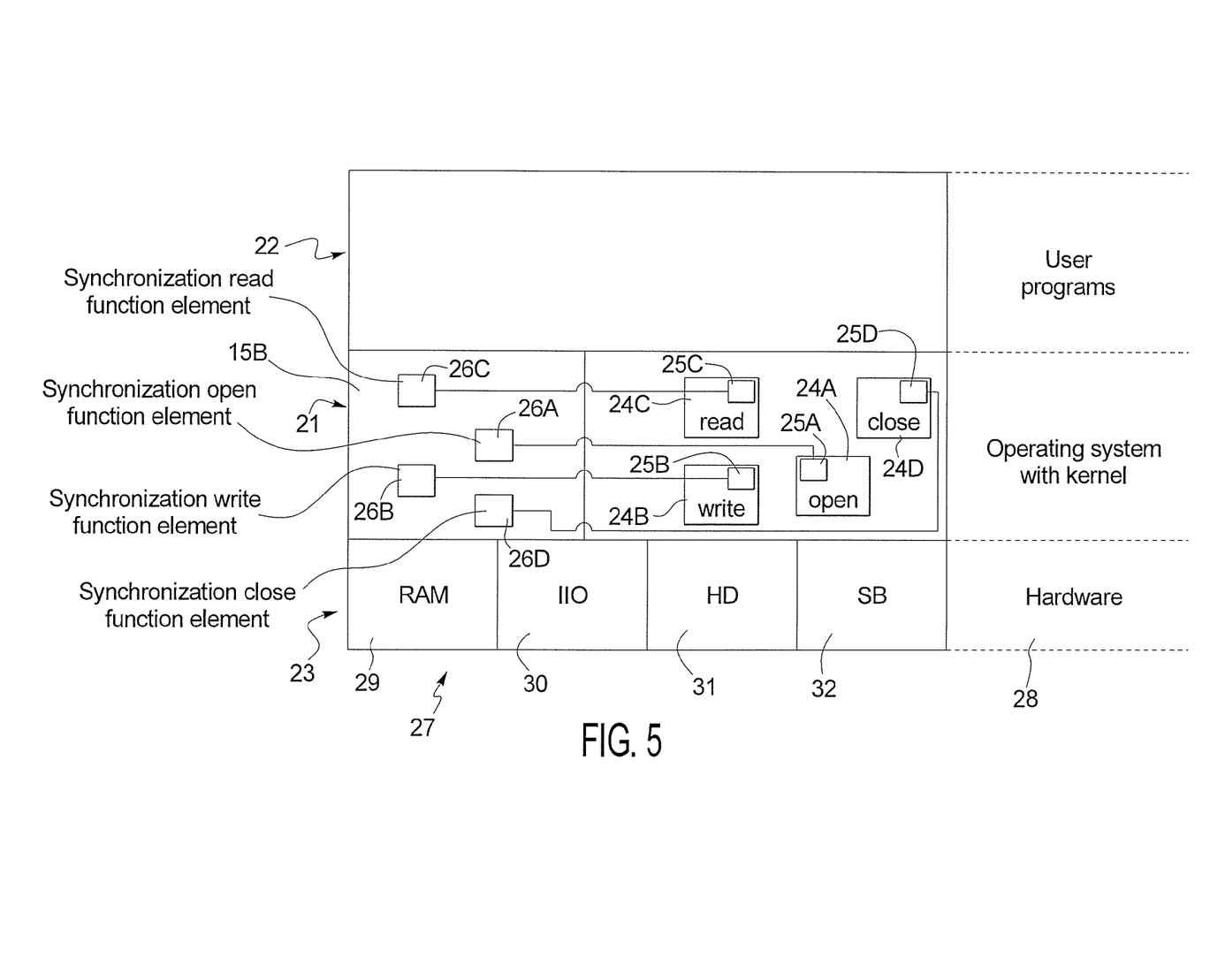
FIG. 5 illustrates the structure of a software that is suitable for execution of the method according to a second preferred embodiment.

Within the scope of the preferred embodiment it is also possible to design the linking of the synchronization function 15B with the operating system 21 such that the synchronization function 15B is integrated into the operating system as shown in FIG. 5. The program segments forming this synchronization function then do not need to be stored in the memory region for user programs but rather are stored in the memory region of the operating system, and thus are an integral component of the operating system.

Figure 6:
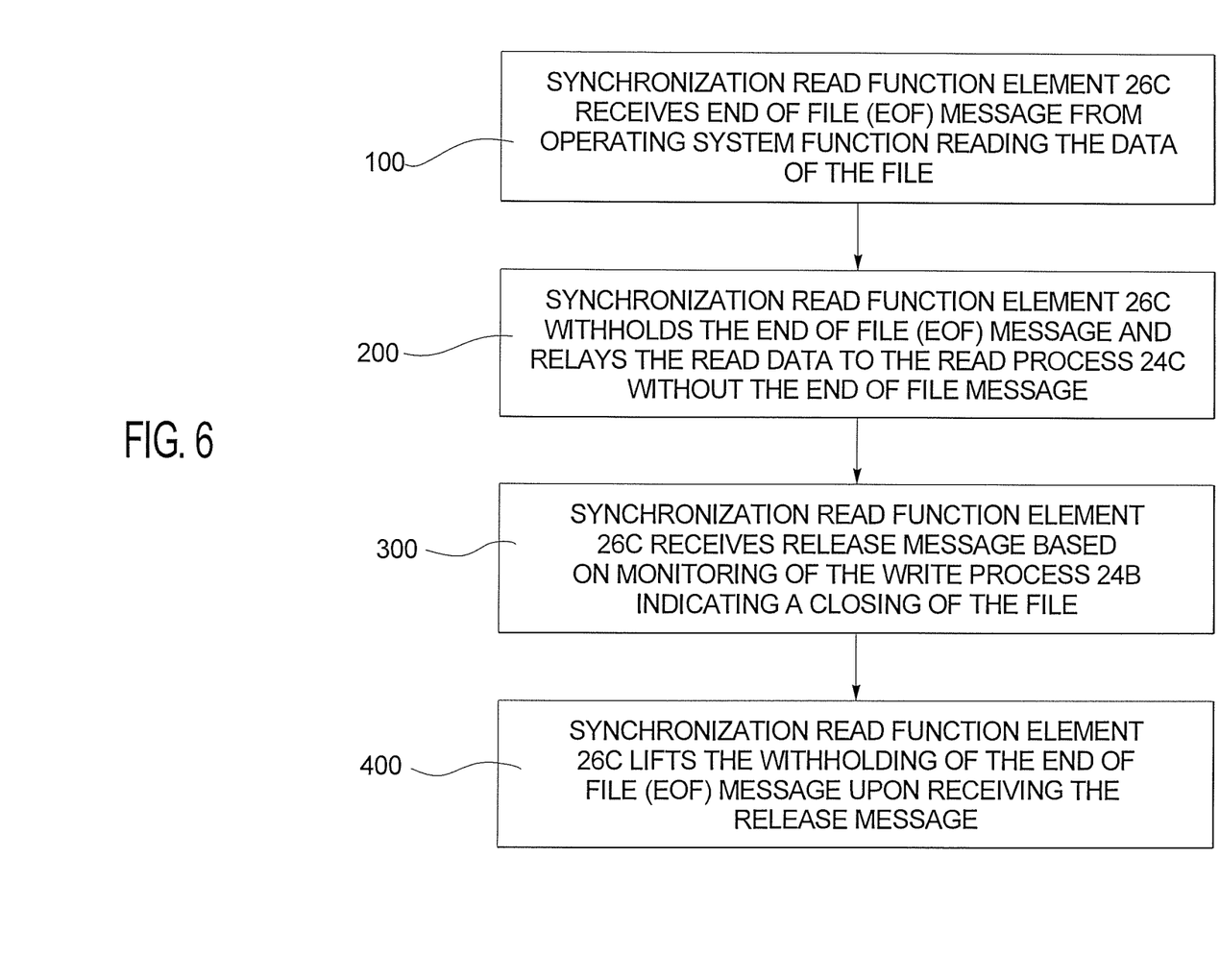
FIG. 6 is a flowchart indicating steps performed by a synchronization read function element of a synchronization function for either the first embodiment or the second embodiment.

FIG. 6 shows a flowchart of steps performed by the synchronization read function element 26C. In step 100 the synchronization read function element 26C receives an end of file (EOF) message from the operating system function reading the data of the file. At step 200, the synchronization read function element 26C withholds the end of file (EOF) message and relays the read data to the read process 24C without the end of file message. In step 300, the synchronization read function element 26C receives a release message based on monitoring of the write process 24B indicating a closing of the file. The step 400, the synchronization read function element 26C lifts the withholding of the end file (EOF) message upon receiving the release message.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for communication between memory-related processes in a computer comprising an operating system software layer having an unmodified write process for writing data of a file into a memory region, an unmodified read process for reading said data of said file from said memory region, an open process for opening said file, and a close process for closing said file, and wherein every time when all data contained in the memory region have been completely read by the read process, an end of file message that an end of the file has been reached is generated by an operating system function reading said data, and wherein said computer also has a user software layer separate from said operating system layer and containing at least one user program, comprising the steps of:

provid­ing a synchronization function independent of said write process and said read process in said operating system software layer or in said user software layer, said synchronization function comprising a synchronization read function element, a synchronization write function element, a synchronization open function element, and a synchronization close function element, said elements being independent of but linked to said respective read process, write process, open process, and close process; and said synchronization read function element of said synchronization function, given temporally overlapping execution of said write process and said read process, performing the steps of
receiving said end of file message from said operating system function reading said data from said memory region,
relaying the read data to said read process but withholding said end of file message when relaying said read data,
receiving a release message based on monitoring of the write process indicating a closing of the file, and
lifting the withholding of the end of file message upon receiving the release message.

2. The method according to claim 1 wherein said synchronization function is located in said operating system software layer.

3. The method according to claim 1 wherein said synchronization function is located in said user software layer.

4. The method according to claim 1 wherein said operating system has a kernel linked by kernel hooks to each of said synchronization function elements.

5. The method of claim 1 wherein the withholding of the end of file message occurs by deleting the end of file message.

6. The method according to claim 1 wherein the data of the file are not deleted upon reading.

7. The method of claim 1 wherein the data of the file are cached by the operating system in a cache memory upon writing of the data by the write process and the data are read from cache memory upon the reading of the data by the read process.

8. The method according to claim 1 wherein the synchronization function is linked with a conversion function to convert data format.

9. The method of claim 1 wherein the synchronization function only releases the file for access by additional processes after the closing of the file.

10. The method according to claim 1 wherein multiple read and write processes access the memory region simultaneously.

11. The method according to claim 1 wherein the read process is positioned at a memory location of the memory region with a positioning function, in said memory location data have not yet been written by the write process, and an operating system message that the read process position lies outside of the file is withheld until data are present at the memory location.

12. A non-transitory computer-readable medium comprising a program for communication between memory related processes in a computer comprising an operating system software layer having an unmodified write process for writing data of a file into a memory region, an unmodified read process for reading said data of said file from said memory region, an open process for opening said file, and a close process for closing said file, and wherein every time when all data contained in the memory region have been completely read by the read process, an end of file message that an end of the file has been reached is generated by an operating system function reading said data, and wherein said computer also has a user software layer separate from said operating system layer and containing at least one user program, said program of said computer-readable medium performing the steps of:

providing a synchronization function independent of said write process and said read process in said operating system software layer or in said user software layer, said synchronization function comprising a synchronization read function element, a synchronization write function element, a synchronization open function element, and a synchronization close function element, said elements being independent of but linked to said respective read process, write process, open process, and close process; and said synchronization read function element of said synchronization function, given temporally overlapping execution of said write process and said read process, performing the steps of
receiving said end of file message from said operating system function reading said data from said memory region,
relaying the read data to said read process but withholding said end of file message when relaying said data,
receiving a release message based on monitoring of the write process indicating a closing of the file, and
lifting the withholding of the end of file message upon receiving the release message.

13. A computer, comprising:
an operating system software layer having an unmodified write process for writing data of a file into a memory region, an unmodified read process for reading said data of said file from said memory region, an open process for opening said file, and a close process for closing said file, and wherein every time when all data contained in the memory region have been completely read by the read process, an end of file message that an end of the file has been reached is generated by an operating system function reading said data;
a user software layer separate from said operating system layer and containing at least one user program; and
a non-transitory computer readable medium comprising a program for performing the steps of
providing a synchronization function independent of said write process and said read process in said operating system software layer or in said user software layer, said synchronization function comprising a synchronization read function element, a synchronization write function element, a synchronization open function element, and a synchronization close function element, said elements being independent of but linked to said respective read process, write process, open process, and close process, and said synchronization read function element of said synchronization function, given temporally overlapping execution of said write process and said read process, performing the steps of receiving said end of file message from said operating system function reading said data from said memory region, relaying the read data to said read process but withholding said end of file message when relaying said data, receiving a release message based on monitoring of the write process indicating a closing of the file, and lifting the withholding of the end of file message upon receiving the release message.

14. A printing system comprising a printing device and a print server to receive and relay print jobs to the printing device, said print server comprising:

an operating system software layer having an unmodified write process for writing data of a file into a memory region, an unmodified read process for reading said data of said file from said memory region, an open process for opening said file, and a close process for closing said file, and wherein every time when all data contained in the memory region have been completely read by the read process, an end of file message that an end of the file has been reached is generated by an opening system function reading said data;

a user software layer separate from said operating system layer and containing at least one user program; and a non-transitory computer-readable medium comprising a program for performing the steps of providing a synchronization function independent of said write process and said read process in said operating system software layer or in said user software layer, said synchronization function comprising a synchronization read function element, a synchronization write function element, a synchronization open function element, and a synchronization close function element, said elements being independent of but linked to said respective read process, write process, open process, and close process, and said synchronization read function element of said synchronization function, given temporally overlapping execution of said write process and said read process, performing the steps of receiving said end of file message from said operating system function when reading said data from said memory region, relaying the read data to said read process but withholding said end of file message relaying said read data, receiving a release message based on monitoring of the write process indicating a closing of the file, and lifting the withholding of the end of file message upon receiving the release message.

* * * * *